(12) United States Patent
Gowreesunker et al.

(10) Patent No.: US 9,651,405 B1
(45) Date of Patent: May 16, 2017

(54) DYNAMIC ADJUSTMENT OF A SAMPLING RATE FOR AN OPTICAL ENCODER

(71) Applicant: Apple Inc., Cupertino, CA (US)

(72) Inventors: Baboo V. Gowreesunker, Cupertino, CA (US); Joseph William Colosimo, Cupertino, CA (US); Vladimir Fedorov, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 250 days.

(21) Appl. No.: 14/640,376

(22) Filed: Mar. 6, 2015

(51) Int. Cl.
*G01D 5/347* (2006.01)

(52) U.S. Cl.
CPC .................................. *G01D 5/3473* (2013.01)

(58) Field of Classification Search
CPC ............................. G01D 5/3473; G01D 5/347
USPC ........................................ 250/231.13–231.18
See application file for complete search history.

(56) References Cited

U.S. PATENT DOCUMENTS

| 6,128,006 | A | 10/2000 | Rosenberg et al. |
|---|---|---|---|
| 8,577,289 | B2 | 11/2013 | Schlub et al. |
| 8,743,083 | B2 | 6/2014 | Zanone et al. |
| 9,088,282 | B2 | 7/2015 | Holenarsipur et al. |
| 2006/0054427 | A1* | 3/2006 | Jasso ..................... G05G 1/10 188/72.1 |
| 2011/0018748 | A1* | 1/2011 | Ratnakar Aravind ........... G11B 20/10009 341/111 |
| 2013/0076375 | A1 | 3/2013 | Hanumanthaiah et al. |
| 2015/0048242 | A1* | 2/2015 | Remillard ............ G01D 5/2448 250/231.14 |
| 2016/0069712 | A1 | 3/2016 | Holenarsipur et al. |
| 2016/0069713 | A1 | 3/2016 | Holenarsipur et al. |

FOREIGN PATENT DOCUMENTS

WO    WO 2009/023395    2/2009

* cited by examiner

*Primary Examiner* — Seung C Sohn
(74) *Attorney, Agent, or Firm* — Brownstein Hyatt Farber Schreck, LLP (57) ABSTRACT

A light source in a rotary optical encoder can illuminate a pattern on a rotatable shaft and an optical sensor can detect either the light that is reflected or transmitted based on the pattern. A sampling rate of the optical sensor is dynamically adjusted based on a rotational speed of the rotatable shaft. A pulse rate of the light source may also be dynamically adjusted based on the sampling rate of the optical sensor.

20 Claims, 8 Drawing Sheets

DYNAMIC ADJUSTMENT OF A SAMPLING RATE FOR AN OPTICAL ENCODER

TECHNICAL FIELD

The present disclosure relates generally to input devices for electronic devices, and more particularly, to an input device that includes an optical encoder.

BACKGROUND

Many electronic devices include various types of input devices. One such input device is a rotary encoder. A rotary encoder is used to determine the angular velocity of a rotatable component associated with the electronic device. With some rotary encoders, a light source can illuminate a portion of a patterned surface of the rotatable component and an optical sensor can collect light reflected by the patterned surface and generate electrical signals corresponding to the collected light. The electronic device can receive and analyze the electrical signals for sequences of rising and falling edges to determine or estimate the angular velocity and/or direction of rotation of the rotatable component.

However, many encoders are not suitable for use within the constrained proportions of an electronic device that has a smaller form factor. As one example, smaller light sources may emit less light, smaller optical sensors may detect less light, and smaller rotatable components with patterned surfaces may be more difficult and/or expensive to manufacture. Furthermore, as angular velocity increases, the contrast of the light reflected by the patterned surface and collected by the optical sensor can decrease. As a result, the accuracy, precision, and/or reliability of angular velocity measurements derived from the optical sensor data can decrease with the size of the rotary encoder. In other examples, small form factor rotary encoders may be limited to a low-speed operation.

Additionally, in some embodiments the rate at which the optical sensor samples the reflected light is a fixed sampling rate. This fixed sampling rate may not be optimal for the rotational speed of the rotatable component. The sampling rate may be too low for higher rotating speeds, which can produce errors in the calculated angular velocity and/or direction of rotation. Similarly, the sampling rate can be too high when the rotatable component rotates at a lower speed. The high sampling rate can consume more power than is necessary. In battery-powered electronic devices, excess power consumption can needlessly reduce the amount of battery charge or power.

SUMMARY

Embodiments described herein may relate to, include, or take the form of an optical encoder including at least a rotatable shaft having a patterned surface, one or more light sources positioned facing (e.g., below) the rotatable shaft and configured to illuminate the patterned surface, one or more optical sensors positioned facing (e.g., below) the rotatable shaft and configured to receive at least a portion of the reflected light from the patterned surface, and a processing device configured to dynamically adjust a sampling rate of the one or more optical sensors based on a rotational speed of the rotatable shaft. In one embodiment, the processing device may also be configured to adjust a pulse rate of the one or more light sources. The pulse rate controls the number of times a light source is "on" in a given period of time. Each light source can be turned on concurrently with at least one optical sensor capturing light and turned off when the at least one optical sensor stops capturing light. Alternatively, in another embodiment, the one or more light sources may remain on for a given period of time, allowing at least one optical sensor to sample the reflected light multiple times during the given period of time.

In one aspect, each optical sensor in the optical encoder includes an array of light sensing elements. As one example, the light sensing elements can be arranged in a linear array. A method of dynamically adjusting the sampling rate of the optical encoder in an electronic device may include sampling signals from two or more light sensing elements at a first time and determining a first phase offset, and sampling signals from the two or more light sensing elements at a second time and determining a second phase offset. The sampling rate of the two or more light sensing elements can be adjusted based on the first and second phase offsets. Additionally, in some embodiments, a pulse rate of one or more light sources may be adjusted based on the sampling rate of the two or more light sensing elements.

In another aspect, an electronic device can include a rotatable shaft having a patterned surface, one or more light sources positioned adjacent to the rotatable shaft and configured to illuminate the patterned surface, and one or more optical sensors that each include multiple light sensing elements positioned adjacent to the rotatable shaft and configured to receive at least a portion of the light reflected off the patterned surface. A sampling rate control module may be operably connected to the light sensing elements and configured to perform the operations of: sampling signals from two or more light sensing elements at a first time and determining a first phase offset; sampling signals from the two or more light sensing elements at a second time and determining a second phase offset; and adjusting a sampling rate of the two or more light sensing elements based on the first and second phase offsets. Additionally, in some embodiments, a pulse rate of one or more light sources may be adjusted based on the sampling rate of the two or more light sensing elements.

And in yet another embodiment, a non-transitory computer-readable medium can store executable instructions which, when executed by a processing device, causes the processing device to perform a method of dynamically adjusting a sampling rate of an optical encoder. The method includes sampling signals from two or more light sensing elements in an optical sensor at a first time and determining a first phase offset, and sampling signals from the two or more light sensing elements at a second time and determining a second phase offset. A sampling rate of the two or more light sensing elements may be adjusted based on the first and second phase offsets. Additionally, in some embodiments, a pulse rate of one or more light sources may be adjusted based on the sampling rate of the two or more light sensing elements For example, in one embodiment, a phase delta is determined by subtracting the first phase offset from the second phase offset, and the sampling rate of the optical encoder is adjusted based on the phase delta. In one embodiment, the phase delta can be compared to a first phase delta threshold and the sampling rate increased if the phase delta is equal to or greater than the first phase delta threshold. The phase delta may also be compared to a second phase delta threshold and the sampling rate decreased if the phase delta is equal to or less than the second phase delta threshold. The sampling rate can be maintained if the phase delta is between the first and second phase delta thresholds.

BRIEF DESCRIPTION OF THE DRAWINGS

Reference will now be made to representative embodiments illustrated in the accompanying figures. The elements of the drawings are not necessarily to scale relative to each other. It should be understood that the following descriptions are not intended to limit the disclosure to one preferred embodiment. To the contrary, each is intended to cover alternatives, modifications, and equivalents as may be included within the spirit and scope of the described embodiments as defined by the appended claims. Identical reference numerals have been used, where possible, to designate identical features that are common to the figures.

DETAILED DESCRIPTION

Embodiments described herein relate to systems and methods for dynamically adjusting the sampling rate of an optical encoder. It should be appreciated that the various embodiments described herein, as well as functionality, operation, components, and capabilities thereof may be combined with other elements as necessary, and so any physical, functional, or operational discussion of any element or feature is not intended to be limited solely to a particular embodiment to the exclusion of others. More particularly, although many embodiments described herein are suitable for use with small form factor electronic devices, the various systems and methods described are not limited to particular form factors and can apply equally to larger embodiments.

Embodiments discussed herein may include a rotary input mechanism that may be manipulated by a user to provide user input. Certain embodiments may include an optical encoder to detect rotational movement of the rotary input mechanism. In some devices, an optical encoder can be used to detect rotational movement, direction and/or speed of the rotary input mechanism in the electronic device.

Many embodiments described herein include a rotatable shaft, one or more light sources, and one or more optical sensors. The rotatable shaft can be configured to rotate about a single axis. The rotatable shaft can include an external surface having a selected pattern formed in or on the surface. For example, a pattern can include a number of light and dark markings or stripes that are axially aligned along the shaft. The pattern on the shaft may be used to determine a rotational speed of the rotatable shaft. In these embodiments, at least one light source can illuminate the patterned surface, and the patterned surface can reflect light onto at least one optical sensor. The optical sensor can then generate electrical signals corresponding to the collected light. The signals can be used to determine a rotational speed of the rotatable shaft. The sampling rate of at least one optical sensor may maintained or adjusted (i.e., increased or decreased) based on the rotational speed of the rotatable shaft.

Additionally, in some embodiments, a pulse rate of one or more light sources can be adjusted based on the sampling rate of the optical sensor. A processing device may be configured to adjust a pulse rate (the "on" and "off" times) of at least one light source. Each light source can be turned on concurrently with at least one optical sensor capturing light and turned off when the at least one optical sensor stops capturing light. In another embodiment, the one or more light sources may remain on for a given period of time, allowing at least one optical sensor to sample the reflected light multiple times during the given period of time.

Figure 1:
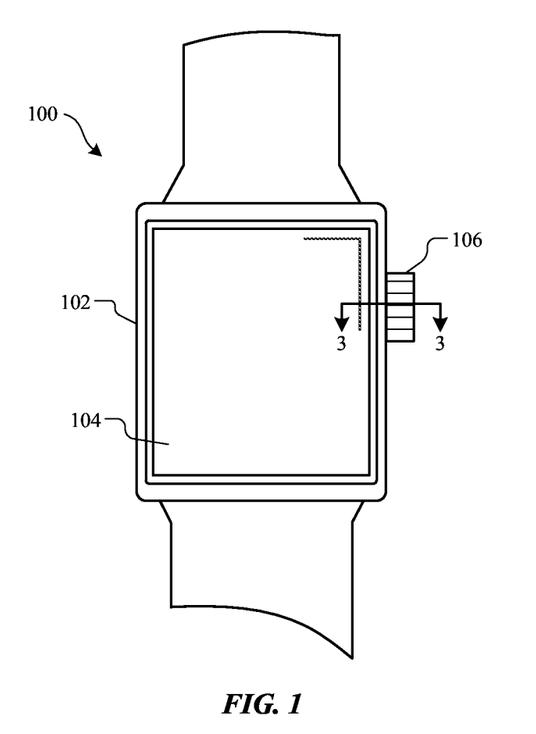
FIG. 1 depicts a top plan view of an example electronic device configured to receive rotation of a rotational component as user input.

Some embodiments disclosed herein may be sized and suitable for use within the constrained proportions of an electronic device having a small form factor. Referring now to FIG. 1, there is shown a top plan view of an example electronic device that is configured to receive the rotation of a rotational component as user input. In the illustrated embodiment, the electronic device 100 may be implemented as a portable electronic device that is adapted to be worn by a user. Other embodiments can implement the electronic device differently. For example, the electronic device can be a smart phone, a gaming device, a digital music player, a sports accessory device, a medical device, a device that provides time and/or weather information, a health assistant, a tablet computing device, a notebook computer, an appliance, and other types of electronic device suitable for receiving rotational user input.

In some embodiments, the electronic device 100 need not necessarily receive user input. For example, the electronic device can measure rotation as a rotation sensor in order to determine the rotation or angular change of another object. For example, the electronic device 100 can be attached to a camera gimbal to determine the angle of the camera. In another example, the electronic device can be attached to a wheel or rotor in order to determine the speed and/or direction of the wheel. Accordingly, embodiments described herein need not be limited to or configured for use with particular electronic devices or particular electronic device types. To the contrary, the embodiments, systems, and methods described herein may be broadly applicable to measure, determine, derive, or estimate rotation information of any rotating body.

As illustrated, electronic device 100 is configured in the form of a wearable communications device. The wearable communications device may include a processing device coupled with or operably connected to a memory, one or more sensors, one or more communication interfaces, output devices such as displays and speakers, one or more input devices, and a health monitoring system. The communication interface(s) can provide electronic communications between the communications device and any external communication network, device or platform, such as but not limited to wireless interfaces, Bluetooth interfaces, USB interfaces, Wi-Fi interfaces, TCP/IP interfaces, network communications interfaces, or any conventional communication interfaces. The wearable communications device may provide information regarding time, health, statuses or externally connected or communicating devices and/or software executing on such devices, messages, video, operating commands, and so forth (and may receive any of the foregoing from an external device), in addition to communications.

The electronic device 100 includes a housing 102 at least partially surrounding a display 104. In many examples, the display 104 may incorporate an input device configured to receive touch input, force input, temperature input, and the like. The electronic device 100 may also include one or more buttons or input devices (not shown). The housing 102 can form an outer surface or partial outer surface and protective case for the internal components of the electronic device 100. In the illustrated embodiment, the housing 102 is formed into a substantially rectangular shape, although this configuration is not required. For example, certain embodiments may include a substantially circular housing 102.

The electronic device 100 can also include a crown 106 or other rotary input that is configured to rotate about an axis. For example, if the display 104 of the electronic device 100 is displaying a time keeping application, the crown 106 may be rotated in either direction to change or adjust the position of the hands or the digits that are displayed for the time keeping application. In some examples, the crown 106 may be positioned off-center with respect to the housing 102, although this configuration is not required.

In some embodiments, the crown 106 may be rotated to move a cursor or other type of selection mechanism from a first displayed location to a second displayed location in order to select an icon or move the selection mechanism between various icons that are presented on the display 104.

Figure 2:
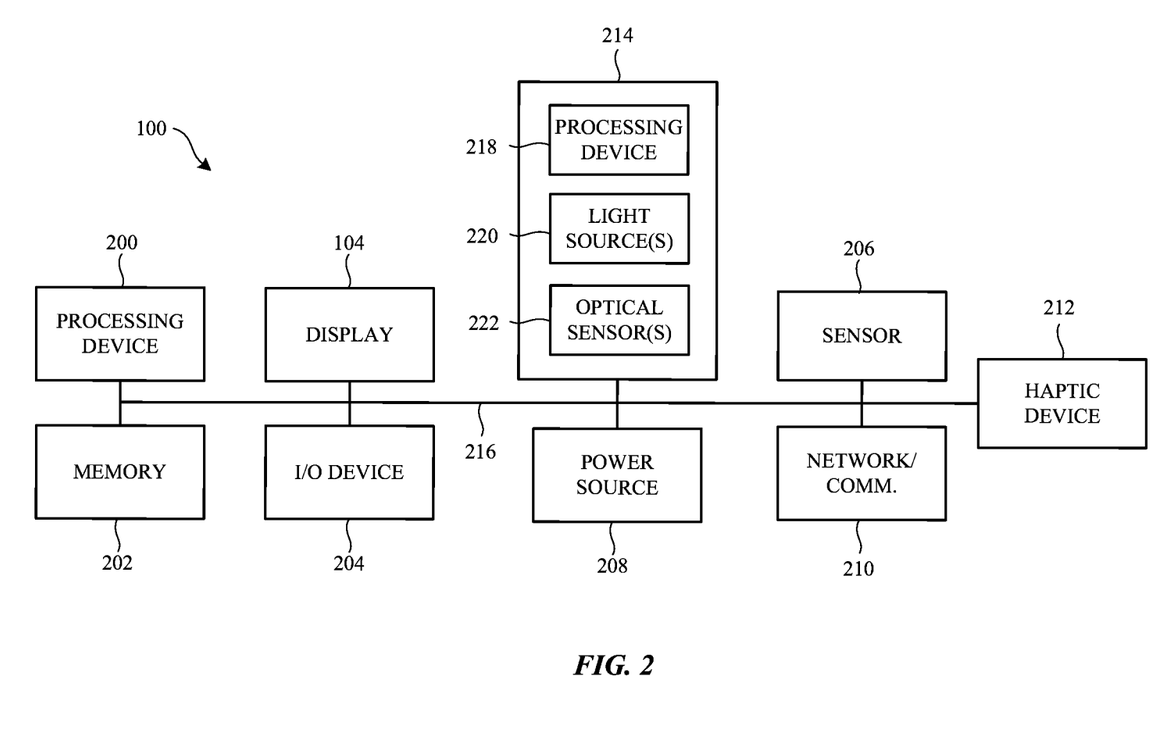
FIG. 2 is an illustrative block diagram of the electronic device 100 shown in FIG. 1.

FIG. 2 is an illustrative block diagram of the electronic device 100 shown in FIG. 1. The electronic device 100 can include the display 104, one or more processing devices 200, memory 202, one or more input/output (I/O) devices 204, one or more sensors 206, a power source 208, a network communications interface 210, a haptic device 212, and an optical encoder 214. The display 104 may provide an image or video output for the electronic device 100. The display 104 may also provide an input surface for one or more input devices, such as, for example, a touch sensing device, force sensing device, temperature sensing device, and/or a fingerprint sensor. The display 104 may be any size suitable for inclusion at least partially within the housing 102 and may be positioned substantially anywhere on the electronic device 100. In some embodiments, the display 104 can be protected by a cover glass formed from a scratch-resistant material (e.g., sapphire, zirconia, glass, and so on) that may form a substantially continuous external surface with the housing 102.

The processing device 200 can control or coordinate some or all of the operations of the electronic device 100. The processing device 200 can communicate, either directly or indirectly, with substantially all of the components of the electronic device 100. For example, a system bus or signal line 216 or other communication mechanism can provide communication between the processing device(s) 200, the memory 202, the I/O device(s) 204, the sensor(s) 206, the power source 208, the network communications interface 210, the haptic device 212, and/or the optical encoder 214.

The one or more processing devices 200 can be implemented as any electronic device capable of processing, receiving, or transmitting data or instructions. For example, the processing device(s) 200 can each be a microprocessor, a central processing unit (CPU), an application-specific integrated circuit (ASIC), a digital signal processor (DSP), or combinations of such devices. As described herein, the term "processing device" is meant to encompass a single processor or processing unit, multiple processors, multiple processing units, or other suitably configured computing element or elements.

The memory 202 can store electronic data that can be used by the electronic device 100. For example, a memory can store electrical data or content such as, for example, audio and video files, documents and applications, device settings and user preferences, timing and control signals or data for the haptic device 212 and/or the optical encoder 214 (or one or more components included therein), data structures or databases, and so on. The memory 202 can be configured as any type of memory. By way of example only, the memory can be implemented as random access memory, read-only memory, Flash memory, removable memory, or other types of storage elements, or combinations of such devices.

The one or more I/O devices 204 can transmit and/or receive data to and from a user or another electronic device. The I/O device(s) 204 can include a touch sensing input surface such as a track pad, one or more buttons, one or more microphones or speakers, one or more ports such as a microphone port, and/or a keyboard.

The electronic device 100 may also include one or more sensors 206 positioned substantially anywhere on the electronic device 100. The sensor or sensors 206 may be configured to sense substantially any type of characteristic, such as, but not limited to, images, pressure, light, touch, force, temperature, position, motion, and so on. For example, the sensor(s) 206 may be an image sensor, a temperature sensor, a light or optical sensor, an atmospheric pressure sensor, a proximity sensor, a humidity sensor, a magnet, a gyroscope, an accelerometer, and so on.

The power source 208 can be implemented with one or more devices capable of providing energy to the electronic device 100. For example, the power source 208 can be one or more batteries or rechargeable batteries. Additionally or alternatively, the power source 208 may be a connection cable that connects the electronic device to another power source, such as a wall outlet or another electronic device.

The network communication interface 210 can facilitate transmission of data to or from other electronic devices. For example, a network communication interface can transmit electronic signals via a wireless and/or wired network connection. Examples of wireless and wired network connections include, but are not limited to, cellular, Wi-Fi, Bluetooth, infrared, and Ethernet.

The haptic device 212 can be implemented as any suitable device configured to provide force feedback, vibratory feedback, tactile sensations, and the like. For example, in one embodiment, the haptic device 212 may be implemented as a linear actuator configured to provide a punctuated haptic feedback, such as a tap or a knock.

The optical encoder 214 may include a processing device 218, one or more light sources 220, and one or more optical sensors 222. In one embodiment, the processing device 218 can be operably connected to the light source(s) 220 and the optical sensor(s) 222. The processing device 218 can transmit timing and control signals to the light source(s) 220 and the optical sensor(s) 222. The processing device 218 may also receive signals from the optical sensor(s) 222. In another embodiment, the processing device 218 can be operably connected to the processing device 200, and the transmission and reception of signals to and from the light source(s) 220 and the optical sensor(s) 222 can be distributed between the two processing devices. In yet another embodiment, the processing device 200 can perform all functions of the processing device 218. The processing device 200 can transmit and receive signals to and from the light source(s) 220 and the optical sensor(s) 222. In such embodiments, the processing device 218 is optional and may not be included in the optical encoder 214.

In one embodiment, each optical sensor(s) 222 includes an array of light sensing elements. The light sensing elements can each be a photodiode, phototransistor, a photogate, and/or an optical image sensor such as a charge-coupled device ("CCD") or complementary metal-oxide semiconductor ("CMOS") imaging sensor. In other examples, more than one type of optical sensor can be used within the same array. The light source(s) 220 can each be a light emitting diode or any other suitable light source. In some embodiments, more than one light source, emitting the same or different wavelength bands of light, can be used.

In many examples, each optical sensor can include eight individual light sensing elements, although this configuration is not required of all embodiments. Optical sensors containing fewer or more light sensing elements are possible.

The light sensing elements in each optical sensor 222 can be aligned in a row perpendicular to the axis of rotation of the shaft, although this configuration is not required. For example, the light sensing elements can be aligned as two or more rows of individual light sensing elements. In some examples, the optical sensor(s) 222 and/or the light sensing elements can be coupled to a bus or other communication line configured to convey data from the light sensing elements to the processing device 218 and/or the processing device 200.

The one or more optical sensors 222 can be separated from the shaft by a selected distance that can vary from embodiment to embodiment. For example, one may appreciate that light reflecting from the patterned surface can scatter or otherwise diffuse as a function of distance, which may reduce the contrast between unique features of the pattern's reflection measurable by the optical sensors. Thus, optimizing the distance between the optical sensor(s) and the patterned surface in order to minimize the effects of scattering can improve the quality of the signal(s) output by the optical sensor.

Figure 3:
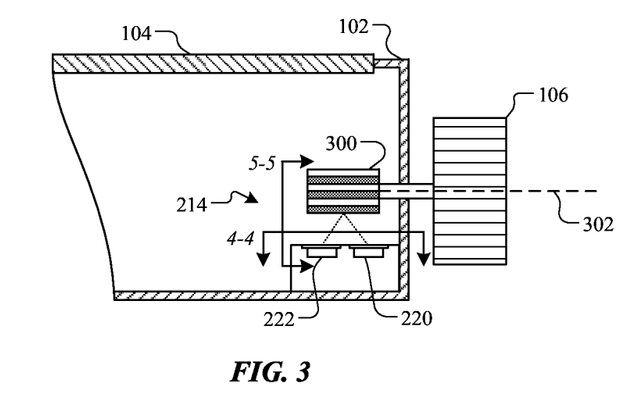
FIG. 3 depicts a cross-sectional schematic view of the example electronic device taken along line 3-3 in FIG. 1.

Embodiments described herein include one light source and one optical sensor. However, multiple light sources and/or optical sensors can be used in other embodiments. The techniques for adjusting the sampling rate and the pulse rate disclosed herein can be used in these other embodiments. FIG. 3 depicts a cross-sectional schematic view of the example electronic device taken along line 3-3 in FIG. 1. The electronic device 100 includes an optical encoder 214 that includes a rotatable shaft 300, a light source 220, and an optical sensor 222. In certain embodiments, the optical encoder 214 can be used to determine rotation of the crown 106. As one example, the optical encoder 214 may be used to detect that movement of a rotatable shaft 300 that corresponds to movement of the crown 106, including, for example, the direction of the movement, speed of the movement and so on. The movement may be rotational movement, translational movement, and/or angular movement.

The optical encoder 214 may also be used to detect the degree of the change of rotation of the crown 106 and/or the angle of rotation of the crown 106 as well as the speed and the direction of the rotation of the crown 106. Once the movement data of the crown 106 is determined, one or more graphics, images or icons on the display 104 of the electronic device 100 may be updated or altered accordingly. In other example, the electronic device 100 can change the brightness of the display 104 or the volume output from one or more speakers. In other examples, the crown 106 may be rotated in a clockwise manner to advance the time displayed by the electronic device 100, or in a counter-clockwise manner to roll back the time.

The rotatable shaft 300 may be coupled to the crown 106 by any suitable means. For example, in some embodiments the rotatable shaft 300 and the crown 106 may be formed from two separate components, coupled together with an intermediate bar (as illustrated). In some embodiments, the rotatable shaft 300 can be an extension of the crown 106. That is, the crown 106 and the rotatable shaft 300 may be manufactured as a single piece.

The rotatable shaft 300 of the optical encoder 214 can be formed with a patterned external surface. As discussed, the patterned surface can be used to determine positional information about the rotatable shaft 300. The patterned surface may include a plurality of light and dark stripes such as those shown in FIGS. 3 and 5.

Figure 5:
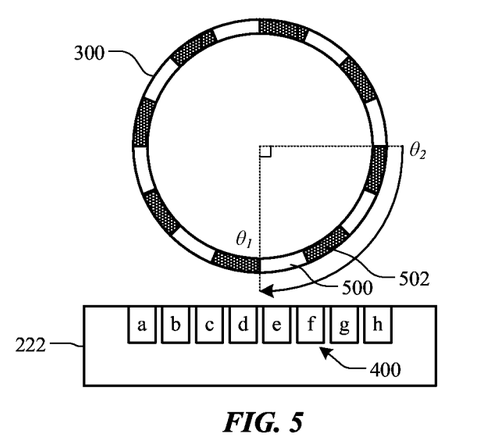
FIG. 5 depicts a side schematic view of the optical encoder taken along line 5-5 in FIG. 3.

Although light stripes and dark stripes are specifically mentioned and shown, the patterned surface may include any given pattern or patterns. In one example, the pattern can consist of various types of stripes having various shades or colors that provide surface contrast. In another example, the patterned surface may include a stripe or marking that has a high reflective surface and another stripe that has a low reflective surface regardless of the color or shading of the stripes or markings. In yet another example, a first stripe of the patterned surface may cause specular reflection while a second stripe of the patterned surface may cause diffuse reflection. And in another example, the pattern of the patterned surface can be assorted combinations of these examples.

In some embodiments, and as illustrated, the stripes of the patterned surface extend axially along the rotatable shaft 300 (parallel to the axis of rotation 302). The stripes may extend along the entire length of the rotatable shaft 300 or partially along a length of the rotatable shaft 300. In addition, the patterned surface may also be disposed around the entire circumference of the rotatable shaft 300. In some embodiments, the patterned surface may include a radial component. In other embodiments, the patterned surface may have both a radial component and an axial component.

In another embodiment, the patterned surface may be disposed only on certain areas of the rotatable shaft 300. For example, if a rotatable shaft 300 is configured to have partial rotational movement about an axis in a given direction (instead of full rotational movement about the axis such as described herein), the patterned surface may only be disposed on the portion of the rotatable shaft 300 that would be visible to the optical sensor 222 as the rotatable shaft 300 is rotated.

The light and dark stripes of the patterned surface may alternate between a light stripe and a dark stripe. In another embodiment, the light stripes and the dark stripes of the patterned surface may be arranged in a particular order. In such embodiments, each section of the pattern may indicate a position of the rotatable shaft 300.

In still further embodiments, the patterned surface can be formed onto the rotatable shaft 300 as one or more radially-variable surface characteristics. In these examples, the surface characteristic(s) of the rotatable shaft 300 can reflect light differently depending upon the angle of rotation of the crown 106. For example, instead of stripes having various shades, colors, or contrasts, certain embodiments can implement the patterned surface as a number of etched, machined, or otherwise physically-implemented lines, structures or features (collectively referred to as "lines"). The lines can be etched into the surface (and/or deposited onto the surface) using any number of suitable methods such as laser etching, laser ablation, particle blast, chemical vapor deposition, chemical etching, and so on. In these examples, the lines may be formed such that adjacent lines have different reflective characteristics (e.g., specular or diffuse reflection, or varying degrees of specular or diffuse reflection). In other examples, other surface characteristics may be implemented. For example, some embodiments can machine grooves into the rotatable shaft 300. As one example, the grooves can extend axially along the rotatable shaft 300 (along the length of the rotatable shaft 300). Such grooves may have different reflective characteristics than the un-machined portions of the rotatable shaft 300. Continuing this example, the grooves may diffuse light to a greater or lesser degree than the un-machined portions. In one non-limiting embodiment, the grooves may diffuse light. As one non-limiting option, this diffusion may occur due to small imperfections left behind or deliberately formed during the machining process, or due to deliberately-created surface features created during machining. Continuing the example, the grooves may be a series of scallops, semi-circular shapes, semi-elliptical shapes, and so on that extend along the longitudinal axis of the shaft, such that a set of scallops or other shapes define a single groove. In other examples, the rotatable shaft 300 can be dimpled along its circumference. In still further examples, the rotatable shaft 300 can include a number of scalloped indentations having other orientations (for example, each groove may have a scalloped cross-section when viewed in a cross-section taken along a diameter of the shaft).

Figure 4:
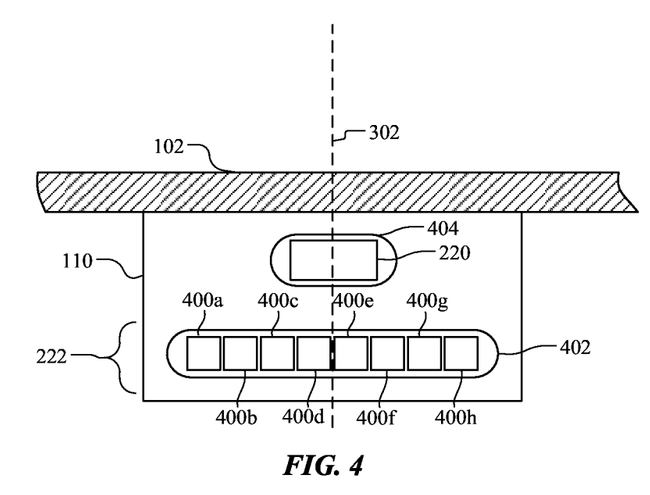
FIG. 4 depicts a top schematic view of the optical encoder taken along line 4-4 in FIG. 3.

Referring now to FIG. 4, there is shown a top schematic view of the optical encoder taken along line 4-4 in FIG. 3. As described above, the optical encoder 214 can be implemented with a light source 220 and an optical sensor 222. As illustrated, the optical sensor 222 is configured as an array of eight independent light sensing elements 400a-400h arranged in a single row. Although eight light sensing elements are illustrated, other numbers of light sensing elements are possible. For example, certain embodiments can be implemented with fewer light sensing elements and certain embodiments can be implemented with additional light sensing elements.

As described earlier, the light sensing elements 400a-400h can each be implemented as photodiode, phototransistor, and/or an optical image sensor such as a charge-coupled device ("CCD") or complementary metal-oxide semiconductor ("CMOS") imaging sensor. In other examples, more than one type of light sensing element can be used.

The light sensing elements 400a-400h may be evenly spaced and can be centered, as a group, along the center of the light source 220 and the axis of rotation 302 of the rotatable shaft 300, although this configuration is not required. For example, in some embodiments other alignments of the light sensing elements 400a-400h are possible. For example, some embodiments can arrange the light sensing elements 400a-400h as two or more rows of optical sensors. More particularly, two rows of four light sensing elements may be used in certain embodiments. In these embodiments, the rows may be offset from one another. In other examples, the rows can be aligned. In still further embodiments, the light sensing elements can be arranged in any suitable arrangement, such as, for example, in a circular arrangement or in a combination of rows and columns.

In many examples, the light sensing elements 400a-400h can be covered or at least partially protected by with a lens 402. Similarly, the light source 220 can be covered or at least partially protected by a lens 404. In the illustrated embodiments, each lens 402, 404 is a lozenge-shaped lens, although this configuration is not required. The lenses 402, 404 can protect the light source 220 and the light sensing elements 400a-400h from interference resulting from the accumulation of foreign matter over time (e.g., dust). In many examples, the lenses 402, 404 can be formed from an optically transparent material such as glass or plastic. In other examples, the lenses 402, 404 can take another shape or may be formed from another material. In still further embodiments, a single lens can cover or at least partially cover both the light sensing elements 400a-400h and the light source 220. In still further embodiments, the lenses 402, 404 may not be required.

FIG. 5 depicts a side schematic view of the optical encoder taken along line 5-5 in FIG. 3. Counterpart to FIG. 5 is FIG. 6, which depicts example waveforms that can be generated by components of the optical encoder of FIG. 5 upon rotation of the rotatable shaft having the alternating black and white patterned surface.

Figure 6:
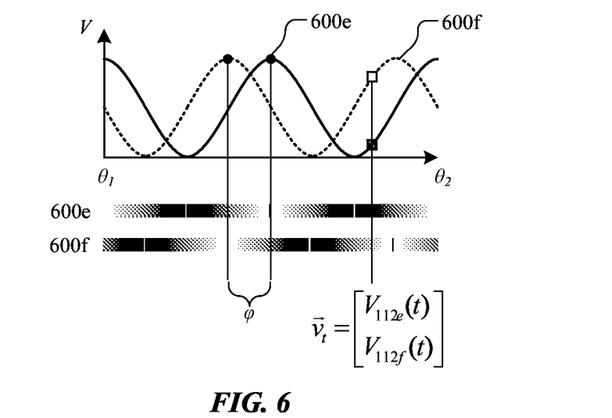
FIG. 6 depicts an example waveform that can be generated by the optical encoder of FIG. 4 upon rotation of the rotatable encoder wheel.

For clarity, the example waveforms illustrated in FIG. 6 correspond only to the two light sensing elements 400e, 400f. However, those skilled in the art will appreciate that similar waveforms can be associated with the other light sensing elements.

An example may aid in comprehension of the embodiment and certain characteristics. As an example, the optical sensors 400e, 400f are stationary while the rotatable shaft 300 rotates a quarter of a full revolution in the clockwise direction (e.g., $$\frac{\pi}{2}$$

radians or 90 degrees). One may appreciate that the quarter turn of the illustrated embodiment is merely provided as a single example. As one example, the methods and systems described herein are not limited to particular minimums of a full revolution. In other words, although FIGS. 5 and 6 are described with respect to a quarter turn of a full revolution of the rotatable shaft 300, a larger or smaller rotation is possible.

The initial position of the rotatable shaft 300, from the perspective of the light sensing elements 400e, 400f, can be identified as a first angle $\theta_1$ and the final position of the rotatable shaft 300 can be identified as a second angle $\theta_2$. As the rotatable shaft 300 rotates in a clockwise direction (as shown), the portions of the patterned surface that are visible to the light sensing elements 400e, 400f can shift from the right of the illustration to the left of the illustration.

As one example, because the light sensing elements 400a-400h are positioned below the rotatable shaft 300 in the illustration, the light sensing element 400f sees a particular portion of the patterned surface of the rotatable shaft 300 immediately before the light sensing element 400e sees the same pattern. In an alternative non-limiting phrasing, if the rotatable shaft 300 rotates clockwise, a signal from the light sensing element 400f will lead a signal from the light sensing element 400e by a certain amount.

While the rotatable shaft 300 is at the first angle $\theta_1$, the light sensing element 400e is closest to a white portion 500 of the patterned surface. Accordingly, at the first angle $\theta_1$, the brightness as observed by the light sensing element 400e is at a maximum (see, e.g., FIG. 6). At the angle $\theta_1$, however, the light sensing element 400f observes a brightness is neither fully white nor fully black because a portion of a black stripe 502 and a portion of the white stripe 500 are both visible to the light sensing element 400f. As the rotatable shaft 300 rotates toward the second angle $\theta_2$, the light sensing element 400f observes a brightness decrease, as the black stripe 502 of the patterned surface becomes nearer to the light sensing element 400f while the white stripe 500 moves farther away. Correspondingly, as the rotatable shaft 300 rotates toward the second angle $\theta_2$, the light sensing element 400e observes a brightness decrease, as the black stripe 502 of the patterned surface becomes nearer to the light sensing element 400e, and the white stripe becomes farther away from the light sensing element 400e.

As the rotatable shaft 300 continues to rotate toward the second angle $\theta_2$, the patterned surface of the rotatable shaft 300, from the perspective of the light sensing elements 400e, 400f, may pass through two complete cycles of fully white to fully black. In other words, two complete periods of a sinusoidal (or pseudo-sinusoidal) wave. As a result of the physical separation of the light sensing elements 400e, 400f, the sinusoidal wave produced by the light sensing element 400f leads the sinusoidal wave produced by the light sensing element 400e. In other words, the waveforms produced by the light sensing elements 400e, 400f are (ideally) identical, separated by a phase offset $\phi$. The phase offset $\phi$ is measurable at any time during the rotation from the first angle $\theta_1$ to the second angle $\theta_2$ by comparing the relative voltage output V of each waveform to the measured frequency of one or both of the waveforms. As one example, by sampling the values of the light sensing elements 400e, 400f at any particular time t, a vector $\vec{v}_t$ can be used in conjunction with a measured frequency of either waveform to determine the phase offset $\phi$ between the two waveforms produced the light sensing elements 400e, 400f.

As noted above, FIG. 6 is a limited example provided for clarity within the figures. In many embodiments, the vector $\vec{v}_t$ will have the same dimension as the number of light sensing elements 400. As one example, for the illustrated embodiment, the $\vec{v}_t$ vector could contain eight entries.

One may appreciate that FIG. 5 may not be drawn to scale, specifically with respect to the relative size of the rotatable shaft 300 and the optical sensor 222. More particularly, in certain embodiments, the optical sensor 222 may be substantially smaller than the diameter of the rotatable shaft 300. In many embodiments, the width of the optical sensor 222 can be selected at least in part on the periodicity of the patterned surface of the rotatable shaft 300.

Figure 7:
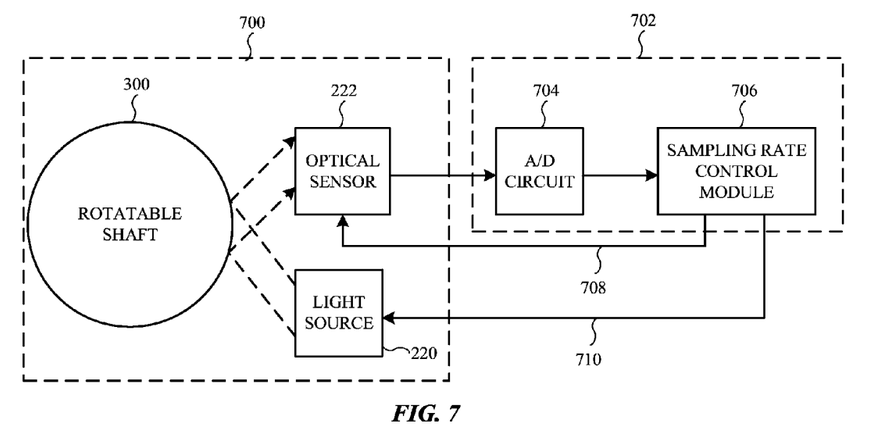
FIG. 7 is a simplified block diagram of a processing channel operably connected to the optical encoder that may be used to dynamically adjust a sampling rate of the optical sensor 222.

Referring now to FIG. 7, there is shown a simplified block diagram of a processing channel operably connected to an optical encoder that may be used to dynamically adjust a sampling rate of the optical sensor 222. The optical encoder 700 shown and described with respect to FIG. 7, and the various components of the optical encoder 700, may be similar to, or used in conjunction with, the optical encoder described above with respect to FIG. 1-6.

As described earlier, in certain embodiments the light source 220 is configured to emit light onto the rotatable shaft 300. The rotatable shaft 300 (or an encoding pattern on the rotatable shaft 300) reflects the light toward an optical sensor 222. As the light from the light source 220 is reflected off of the rotatable shaft 300, each light sensing element in the optical sensor 222 may produce a signal (e.g., a voltage measurement) that is associated with the amount of light received by the light sensing element at a given sampling time.

The signals produced by the optical sensor 222 are received by a processing channel 702. In the illustrated embodiment, the processing channel includes an analog-to-digital converter (ADC) 704 and a sampling rate control module 706. The signals produced by the optical sensor 222 are received by the ADC 704, which converts the analog signals to digital signals. The digital signals may then be used to determine a rotation or other movement of the rotatable shaft 300, the speed of the movement of the rotatable shaft 300, and so on.

The sampling rate control module 706 can be implemented with any suitable processing device. For example, in one embodiment the sampling rate control module 706 is the processing device 218 shown in FIG. 2 (or software implemented by the processing device 218). In another embodiment, the sampling rate control module 706 is the processing device 200 shown in FIG. 2 (or software implemented by the processing device 200). And in yet another embodiment, the functions of the sampling rate control module 706 are distributed between the processing devices 200 and 218 shown in FIG. 2 (or between software implemented by the processing devices 200 and 218).

The sampling rate control module 706 is configured to dynamically determine or adjust a sampling rate of the optical sensor 222. More specifically, the sampling rate control module 706 receives signals from the ADC 704 that are sampled from some or all of the light sensing elements in the optical sensor 222 at various sampling times. After receiving the signals, the sampling rate control module 706 is configured to calculate phase offsets associated with the signals, compare the phase offsets with one another to produce phase deltas, compare the phase deltas to one or more phase delta thresholds, and adjust the sampling rate of the optical sensor based on the comparison. As a result, a determination may be made as to whether the sampling rate of the optical sensor 222 should increase, decrease, or be maintained.

The sampling rate control module 706 is configured to transmit a control signal to the optical sensor 222 via signal line 708. The control signal controls the sampling operations of the optical sensor. Upon receiving the control signal, the optical sensor may increase, decrease, or maintain the sampling rate of one or more light sensing elements.

Additionally, in some embodiments, the sampling rate control module 706 is configured to dynamically determine or adjust a pulse rate of the light source 220. The pulse rate controls the number of times the light source is "on" in a given time period. The pulse rate may be adjusted based on the sampling rate of the optical sensor 222. As one example, the pulse rate of the light source 220 increases when the sampling rate of the optical sensor 222 increases. Similarly, the pulse rate of the light source 220 decreases when the sampling rate of the optical sensor 222 decreases.

The sampling rate control module 706 is configured to transmit a control signal to the light source 220 via signal line 710. The control signal controls the pulse rate of the light source 220. Upon receiving the control signal, the light source may increase, decrease, or maintain the pulse rate of the light source 220.

Other embodiments can operate the light source 220 differently. In one example, the light source 220 may be turned on for a given period of time. During that period of time, the optical sensor 222 can capture light reflected from the rotatable shaft multiple times.

Figure 8:
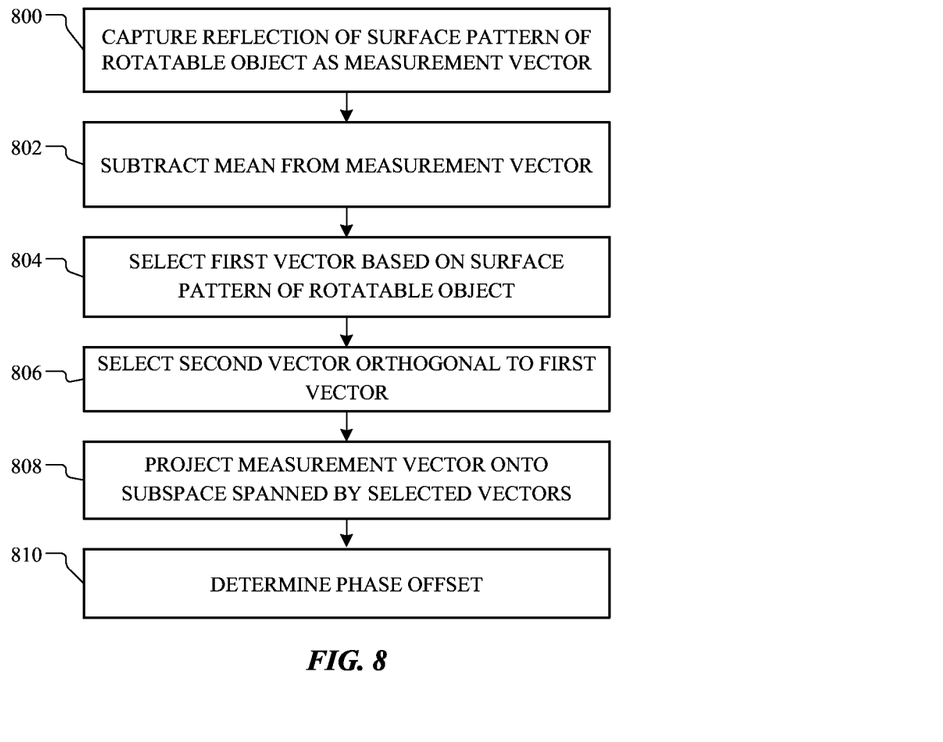
FIG. 8 is a flowchart depicting example operations of a method for determining the phase offset in an optical encoder.

The sampling rate control module 706 can use various techniques to determine the phase offset associated with the signals received from the optical sensor. FIG. 8 is a flowchart depicting example operations of a method for determining the phase offset in an optical encoder. For a particular sampling time (a snapshot), all of the light sensing elements in an optical sensor can be read simultaneously. The digital signals corresponding to each light sensing element can be stored in a snapshot vector of a dimension equal to the number of light sensing elements of the particular embodiment (block 800). The snapshot vector can be stored in a memory, such as memory 202 in FIG. 2. For example, if an embodiment implements an optical sensor with eight light sensing elements, a snapshot vector may contain eight elements.

The readings $x_0$-$x_n$ of the light sensing elements can correspond to voltage output by each individual light sensing element (e.g., sensor 0 through sensor n). In other examples, the readings $x_0$-$x_n$ of the light sensing elements can correspond to a resistance or a capacitive change output by each individual light sensing element. In one non-limiting embodiment, the snapshot vector can be modeled as:

$$\vec{v}_{snap} = \begin{bmatrix} x_0 \\ x_1 \\ \vdots \\ x_n \end{bmatrix} \quad \text{Equation 1}$$

In this example, the number of light sensing elements is n+1. Further, as described above, the light and/or absence of light measurable by an individual light sensing element can depend on the contrast of the reflection of the patterned surface onto the particular light sensing element (see e.g., FIGS. 5-6).

Thereafter, the analog values corresponding to the light detected by each light sensing element can be converted into digital values by an ADC. In one non-limiting phrasing, the values can correspond to an 'image' of the pattern reflected onto the optical sensor at a particular time. As noted above, the digital values of a snapshot can correspond to a brightness measurement of light at each of the light sensing elements. In another embodiment, the digital values of a snapshot can correspond to other information such as color, brightness, modulation frequency, measurements of diffusion and/or focus, and so on.

A snapshot vector can be conditioned and/or normalized before further processing. For example, at block 802, a direct current bias or other offset can be subtracted from each entry within the snapshot vector. As one example, the average $\mu$ of all entries within the vector can be subtracted from each entry. In one non-limiting embodiment, the normalized snapshot vector can be modeled as:

$$\vec{v}_{snap} - \mu = \begin{bmatrix} x_0 - \mu \\ x_1 - \mu \\ \vdots \\ x_n - \mu \end{bmatrix} \quad \text{Equation 2}$$

A snapshot vector may next be filtered via subspace projection. More particularly, as partially noted above, the projection of the snapshot vector onto a suitable subspace of the same dimension can be calculated after vectors spanning the desired subspace are selected. One may appreciate that orthogonal spanning vectors can simplify the projection calculation. As one example, because orthogonal spanning vectors have inner products equal to zero, the operations required to calculate the projection of the snapshot vector onto the selected subspace are the inner products of the snapshot vector and each individual spanning vector. In other words, orthogonal projections may be simpler to compute than oblique projections, especially as the dimensions of the vectors increase.

In certain embodiments, the dimension of each spanning vector is equal to the dimension of the snapshot vector. As one example, dimensional parity between the spanning vectors and the snapshot vector is required to compute the projection of the snapshot vector onto the subspace spanned by the spanning vectors.

For example, if a substantially sinusoidal distribution of light is expected across the optical sensor as a result of the reflection of a particular pattern, a subspace spanned by two orthogonal sinusoidal (e.g., sine and cosine) vectors may be used to define a subspace projection filter. In one non-limiting embodiment, a suitable sinusoidal spanning vector can be modeled as:

$$\vec{s}_1 = \begin{bmatrix} A\sin(Bi_0 + C) + D \\ A\sin(Bi_1 + C) + D \\ \vdots \\ A\sin(Bi_n + C) + D \end{bmatrix} \quad \text{Equation 3}$$

In this example, the variables A, B, C and D define parameters of the sinusoidal wave (e.g., period, phase, frequency, DC offset, and so on). Similarly, a cosine vector that can be orthogonal to $\vec{s}_1$ such that $<\vec{s}_1, \vec{s}_2> = 0$ (e.g., inner product of $\vec{s}_1$ and $\vec{s}_2$ is zero) can be modeled as:

$$\vec{s}_2 = \begin{bmatrix} A\cos(Bi_0 + C) + D \\ A\cos(Bi_1 + C) + D \\ \vdots \\ A\cos(Bi_n + C) + D \end{bmatrix} \quad \text{Equation 4}$$

In further embodiments, non-orthogonal spanning vectors may be used, although it may be appreciated that because the inner product of orthogonal vectors is zero, a subspace filter defined by orthogonal vectors is computationally simpler, and may be preferable for certain embodiments. However, notwithstanding the potential differences in calculation time and complexity for certain embodiments, oblique projections may be used and preferred for use with some embodiments. In some embodiments, other vector spaces can be used. For example, a periodic signal with strong sinusoidal component can be used.

Some embodiments can utilize methods beyond orthogonal or oblique projections. For example, some embodiments can include over-complete representations, dictionaries, and/or sparse reconstruction methods.

Referring back to the method depicted in FIG. 8, a first vector (e.g., $\vec{s}_1$) can be selected based on, at least in part, the expected reflection of the patterned surface on the optical sensor (block 804). For example, if the expected reflection of a particular pattern is a sine wave that may be phase shifted depending upon the linear position of the reflection, then the first vector selected may be a sine wave having substantially the same period as the expected sine wave. As one example, if a particular pattern is expected to reflect one period $$\frac{B}{2\pi}$$

of a sine wave onto the eight light sensing elements, the first vector can be comprised of eight discrete entries corresponding to the values of the sine wave at $$\frac{B}{7}i,$$

where i is the index of the particular entry. The denominator of one less than eight (e.g., seven) can ensure that the entries at index 1 and index 8 are each at the endpoints of a particular period.

In another example, if the expected reflection of a particular pattern is a triangular wave that may be phase shifted depending upon the linear position of the reflection, then the first vector selected may be a triangular wave having substantially the same period as the expected triangular wave.

As noted above, the dimension of the first vector is equal to the dimension of the snapshot vector. As one example, dimensional parity between the spanning vector and the snapshot vector is required to compute the projection of the snapshot vector onto the subspace spanned by the first spanning vector. As one example, dimensional parity is required to compute an inner product, which is required to calculate a projection.

Referring back to the method depicted in FIG. 8, a second vector (e.g., $\vec{s}_2$) that is orthogonal to the first vector can be selected based on, at least in part, the expected reflection of the patterned surface on the optical sensor (block 806). As one example, if the first vector corresponds to a sine wave, the second vector can correspond to a cosine wave of the same amplitude, period, phase offset, and bias (e.g., A, B, C, D of Equations 1 and 2).

The projection of the snapshot vector may be computed at block 808 by summing the scalar projections of the snapshot vector onto each of the first and second vectors. In another phrasing, the projection of the snapshot vector onto the selected subspace may be equal to the sum of each of the first and second vector scaled by a factor equal to the inner product of the snapshot vector and the respective spanning vector. In one non-limiting embodiment, the projection calculation can begin by defining a subspace S:

$$S=[\vec{s}_1 \vec{s}_2] \quad \text{Equation 5}$$

As noted above, the subspace can be spanned by the two vectors $\vec{s}_1$ and $\vec{s}_2$. Next, two scalar coefficients $\alpha_1$ and $\alpha_2$ can be defined as the inner products of the spanning vectors $\vec{s}_1$ and $\vec{s}_2$ and the snapshot vector $\vec{v}_{snap}$:

$$\alpha_1 = \langle \vec{v}_{snap}, \vec{s}_1 \rangle \quad \text{Equation 6}$$

$$\alpha_2 = \langle \vec{v}_{snap}, \vec{s}_2 \rangle \quad \text{Equation 7}$$

The scalar coefficients can then be used to calculate the projection of the snapshot vector $\vec{v}_{snap}$ onto the subspace S:

$$\text{Proj}_S \vec{v}_{snap} = \alpha_1 \vec{s}_1 + \alpha_2 \vec{s}_2 \quad \text{Equation 8}$$

As noted earlier, the projection of the snapshot vector may be computed by summing the scalar projections of the snapshot vector onto each spanning vector. In certain embodiments, while performing the projection calculation, the scaling coefficients $\alpha_1$ and $\alpha_2$ (e.g., inner products of the snapshot vector with each respective spanning vector) can be saved. Thereafter, at block 810, the arctangent of the ratio of the scaling factors can be computed to find the phase offset between the entries of snapshot vector. For example:

$$\varphi_{offset} = \arctan\left(\frac{\alpha_1}{\alpha_2}\right) \quad \text{Equation 10}$$

In other words, the phase difference $\varphi_{offset}$ across the snapshot vector can correlate to the linear position of the reflection of the patterned surface onto the array of light sensing elements, which in turn can correlate to the rotation of the shaft.

In an alternative non-limiting phrasing, the method depicted in FIG. 8 performs a subspace projection filter to assist with the computation of the phase and predicted error of a particular snapshot of values recorded from the optical sensor.

Figure 9:
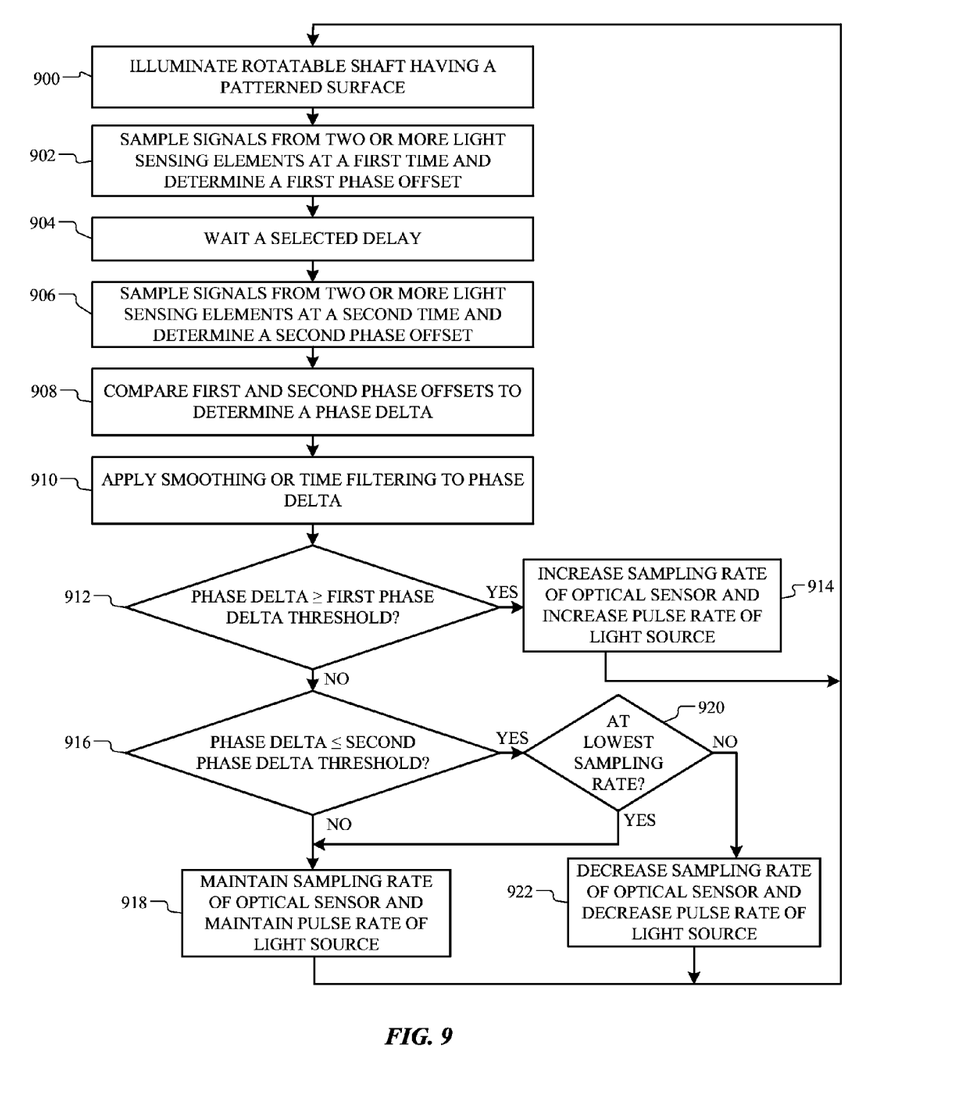
FIG. 9 is a flowchart depicting example operations of a first method for dynamically adjusting the sampling rate of an optical sensor.

Referring now to FIG. 9, there is shown a flowchart depicting example operations of a first method for dynamically adjusting the sampling rate of an optical sensor. Initially, a rotatable shaft, such as the rotatable shaft described with respect to some embodiments described herein, is illuminated by a light source (block 900). The rotatable shaft can have a patterned surface such as the patterned surfaces shown in FIGS. 3 and 5.

The signals from two or more light sensing elements in the optical sensor are then sampled at a first sampling time (a first snapshot) and a first phase offset for the signals is determined (block 902). After waiting a selected delay at 904, the signals from the two or more light sensing elements are sampled again at a second sampling time (a second snapshot) and a second phase offset for the signals is determined (block 906). Thereafter, the first and second phase offsets can be compared to one another to produce a phase offset delta (block 908). In one embodiment, the phase offset delta is calculated by subtracting the first phase offset from the second phase offset.

A smoothing operation or time filtering can be applied to the phase offset delta at block 910. For example, a moving average or autoregressive smoothing can be used. Block 910 is optional and can be omitted in other embodiments.

A determination may then be made at block 912 as to whether the phase offset delta is greater than or equal to a first phase delta threshold. If so, the process passes to block 914 where the sampling rate of the optical sensor and the pulse rate of the light source are increased. In one embodiment, the frequency of the pulse rate can substantially match the frequency of the sampling rate. The method then returns to block 900. Adjustment of the sampling rate is described in more detail in conjunction with FIG. 11.

If the phase offset delta is not greater than or equal to the first phase delta threshold, the method continues at block 916 where a determination may be made as to whether the phase offset delta is less than or equal to a second phase delta threshold. If not, the process passes to block 918 where the sampling rate of the optical sensor and the pulse rate of the light source are maintained. The method then returns to block 900.

If, however, the phase offset delta is less than or equal to the second phase delta threshold, the method continues at block 920 where a determination may be made as to whether the current sampling rate is the lowest sampling rate. If so, the process passes to block 918 where the sampling rate of the optical sensor and the pulse rate of the light source are maintained. If the current sampling rate is not the lowest sampling rate, the method continues at block 922 where the sampling rate of the optical sensor and the pulse rate of the light source are decreased. In one embodiment, the frequency of the pulse rate can substantially match the frequency of the sampling rate. The method then returns to block 900.

The method shown in FIG. 9 can be performed with additional blocks, with fewer blocks, or with different operations in one or more blocks. For example, as described earlier, some embodiments may turn and leave on a light source while the optical sensor captures multiple samples of the reflected light. In such embodiments, blocks 914 and 922 may adjust the sampling rate of the optical sensor while not changing the pulse rate of the light source.

The method of FIG. 9 can be repeated rapidly such that individual samples (and the calculated phase offsets and phase deltas) may be processed in quick succession. As one example, a large number of sequential samples may be taken at a particular sampling rate. For example, certain embodiments may take several thousand samples per second, while other embodiments may take only a few samples per second.

In these examples, the sampling rate can be selected dynamically based on the phases offset deltas calculated for the samples. In one embodiment, the phase offset delta will be between zero and ninety degrees. As the phase offset delta nears ninety degrees, the sampling rate is increased. Conversely, as the phase offset delta nears zero degrees, the sampling rate is decreased. In one example, the first phase delta threshold is sixty degrees and the second phase delta threshold is forty-five degrees. So the sampling rate is increased when the phase delta is equal to or greater than sixty degrees, while the sampling rate is decreased when the phase delta is equal to or less than forty-five degrees. Other embodiments can use different values for the first and second phase offset thresholds.

Figure 10:
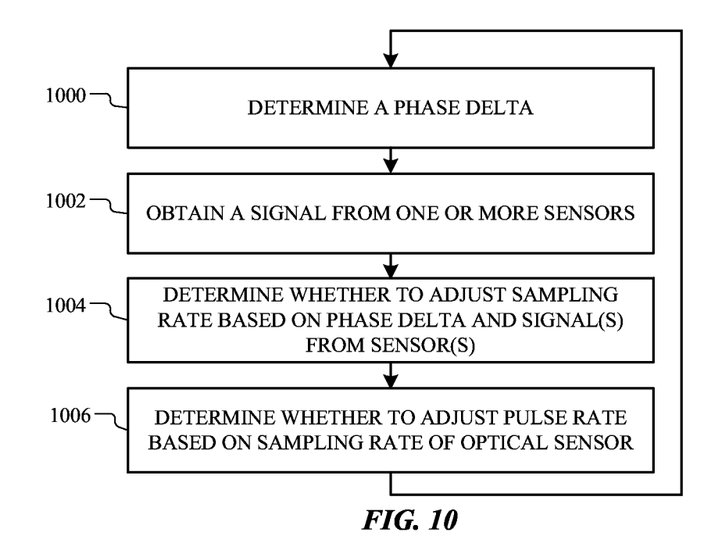
FIG. 10 is a flowchart depicting example operations of a second method for dynamically adjusting the sampling rate of an optical sensor.

FIG. 10 is a flowchart depicting example operations of a second method for dynamically adjusting the sampling rate of an optical sensor. Initially, a phase delta is determined at block 1000. In one embodiment, the phase delta is calculated using blocks 900-908 in FIG. 9, although other embodiments are not limited to this configuration. Next, as shown in block 1002, a signal may be obtained from one or more sensors. For example, a signal can be received from a proximity sensor indicating a portable electronic device is being held or worn by a user. Additionally or alternatively, a signal may be received from an accelerometer that indicates the user is active (e.g., jogging) and therefore less likely to turn the rotatable shaft at a high speed. Based on the determined phase delta and the signal(s) from at least one sensor, a determination can be made at block 1004 as to whether the sampling rate of an optical sensor should be adjusted. Based on the sampling rate of the optical sensor, an optional determination may be made at block 1006 as to whether the pulse rate of a light source should be adjusted. As described previously, in one embodiment the frequency of the pulse rate substantially matches the frequency of the sampling rate. The process then returns to block 1000.

In some embodiments, the sampling rate can be adjusted based on an application or user interface running on the electronic device. For example, a user may be playing a particular game application that includes an input or action that requires the rotatable shaft be rotated at a high speed. The sampling rate may be increased while the game application is running and/or while the user is interacting with the game application. Additionally or alternatively, a certain user interface may require the user to rotate the rotatable shaft slowly. In this example, the sampling rate can be decreased while the user interface screen is running and/or while the user is interacting with the user interface.

Figure 11:
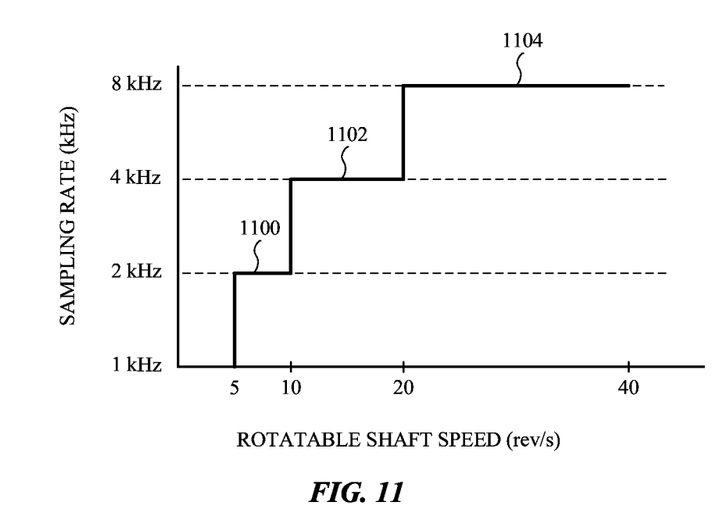
FIG. 11 illustrates a simplified graph of example sampling rates for an optical encoder.

The sampling rate can be increased or decreased by any given amount. In one embodiment, a set of discrete sample rates can be used by an optical encoder. FIG. 11 illustrates a simplified graph of example sampling rates for an optical encoder. As shown in FIG. 11, the discrete sampling rates may be 1 kHz, 2 kHz, 4 kHz, and 8 kHz. A sampling rate control module can control the transition between these scan rates to maintain a minimum number of samples per stripes. For example, a sampling rate of 1 kHz can obtain four samples per stripe when a rotatable shaft having fifty stripes has a rotation speed of five revolutions per second (5 rev/sec×50 stripes×4 samples=1 kHz). However, the sampling rate needs to increase to 8 kHz to obtain the same number of samples per stripe (four samples) when the same rotatable shaft is rotating at forty revolutions per second (40 rev/sec×50 stripes×4 samples=8 kHz).

The sampling rate can be uniform or non-linear. The illustrated graph depicts a set of non-linear sampling rates that are powers of two. Other embodiments can employ sampling rates that are different from the sampling rates shown in FIG. 11. For example, in one embodiment, the sampling rates may increase and decrease uniformly by adjusting the sampling rate linearly (e.g., by a fixed amount of N kHz). Alternatively, the sampling rate may increase non-linearly and decrease uniformly, or vice versa.

In FIG. 11, the sampling rate is 1 kHz while the number of revolutions per second is less than five. The sampling rate increases to 2 kHz while the number of revolutions per second is greater than or equal to five and less than ten (see 1100). The sampling rate increases to 4 kHz while the number of revolutions per second is greater than or equal to ten and less than twenty (see 1102). And the sampling rate increases to 8 kHz while the number of revolutions per second is greater than or equal to twenty (see 1104). As described earlier, a sampling rate control module can control the transition between these scan rates to maintain a minimum number of samples per stripes.

Dynamically adjusting the sampling rate of an optical encoder can save power by sampling the reflected light at a rate that is based at least in part on the speed at which the rotatable shaft is rotating. Compared to conventional optical encoders that use a constant sampling rate all the time, embodiments that dynamically adjust the sampling rate can reduce the amount of power that is consumed by the optical encoder.

Additionally, the rotatable shafts are not the same or uniform and can vary between multiple optical encoders.

For example, one rotatable shaft may be longer than another rotatable shaft, or the stripes on one rotatable shaft are narrower than the stripes on another rotatable shaft. Dynamic adjustment of the sampling rate can compensate for these variations and obtain the correct number of samples per stripe most or all of the time.

Many embodiments of the foregoing disclosure may include or may be described in relation to various methods of operation, use, manufacture, and so on. Notably, the operations of methods presented herein are meant only to be exemplary and, accordingly, are not necessarily exhaustive. For example an alternate operation order, or fewer or additional steps may be required or desired for particular embodiments.

Some embodiments may include a configuration in which a processing device is configured to dynamically adjust the sampling rate of an optical encoder. Additionally or alternatively, some embodiments may include a non-transitory computer-readable medium that stores executable instructions which, when executed by a processing device, causes the processing device to perform a method of dynamically adjusting a sampling rate of an optical encoder.

Although the embodiments described herein include a rotatable shaft that has a patterned surface extending axially along the rotatable shaft, other embodiments are not limited to this configuration. Other embodiments of a rotary optical encoder can position a light source on one side of a rotating surface (e.g., a rotating disk) and an optical sensor on the other side of the rotating disk. The rotating surface may include a pattern of openings, and light is transmitted through the openings and sensed by the optical sensor. In such embodiments, the optical sensor is detecting transmitted light instead of reflected light.

Additionally, other embodiments of a rotary optical encoder can include the patterned surface on one or more ends of the rotatable shaft. In such embodiments, the patterned surface does not extend axially along the rotatable shaft but instead is located at one or both ends of the rotatable shaft. One or more light sources and optical sensors can face at least one end and the light source emitting light toward the end and the optical sensor capturing light reflected from the end.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not meant to be exhaustive or to limit the embodiments to the precise forms disclosed. It will be apparent to one of ordinary skill in the art that many modifications and variations are possible in view of the above teachings. In particular, any features described with respect to one embodiment may also be used in some embodiments, where compatible. Likewise, the features of the different embodiments may be exchanged, substituted, or omitted where compatible and appropriate.

We claim:

1. A method of dynamically adjusting a sampling rate of an optical encoder in an electronic device, the optical encoder including an optical sensor comprising multiple light sensing elements, the method comprising:
   sampling signals from two or more light sensing elements at a first time and determining a first phase offset;
   sampling signals from the two or more light sensing elements at a second time and determining a second phase offset; and
   adjusting the sampling rate of the two or more light sensing elements based on the first and second phase offsets.

2. The method as in claim 1, further comprising determining a phase delta by subtracting the first phase offset from the second phase offset.

3. The method as in claim 2, wherein adjusting the sampling rate of the two or more light sensing elements based on the comparison of the first and second phase offsets comprises adjusting the sampling rate of the two or more light sensing elements based on the phase delta.

4. The method as in claim 3, further comprising:
   prior to adjusting the sampling rate, determining if the phase delta is equal to or greater than a first phase delta threshold; and
   increasing the sampling rate if the phase delta is equal to or greater than the first phase delta threshold.

5. The method as in claim 4, wherein the first phase delta threshold comprises sixty degrees.

6. The method as in claim 4, further comprising:
   prior to adjusting the sampling rate, determining if the phase delta is equal to or less than a second phase delta threshold; and
   decreasing the sampling rate if the phase delta is equal to or less than the second phase delta threshold.

7. The method as in claim 6, further comprising:
   prior to decreasing the sampling rate, determining if the sampling rate is at a minimum sampling rate; and
   maintaining the sampling rate if the sampling rate is at the minimum sampling rate.

8. The method as in claim 6, wherein the second phase delta threshold comprises forty-five degrees.

9. The method as in claim 8, wherein the first and second phase delta thresholds are the same phase delta threshold.

10. The method as in claim 6, further comprising maintaining the sampling rate if the phase delta is between the first and second phase delta thresholds.

11. The method as in claim 1, further comprising adjusting a pulse rate of a light source based on the sampling rate of the two or more light sensing elements.

12. The method as in claim 1, further comprising:
   prior to adjusting the sampling rate of the two or more light sensing elements, receiving a signal from one or more sensors in the electronic device; and
   adjusting the sampling rate of the two or more light sensing elements based on the first and second phase offsets and at least one signal received from the one or more sensors.

13. An electronic device, comprising:
   a rotatable shaft having a patterned surface;
   a light source positioned adjacent to the rotatable shaft and configured to illuminate the patterned surface;
   an optical sensor comprising a plurality of light sensing elements positioned adjacent to the rotatable shaft and configured to receive at least a portion of light reflected off the patterned surface; and
   a sampling rate control module operably connected to the optical sensor and configured to:
   sample signals from two or more light sensing elements at a first time and determining a first phase offset;
   sample signals from the two or more light sensing elements at a second time and determining a second phase offset; and adjust a sampling rate of the optical encoder based on the first and second phase offsets.

14. The electronic device as in claim 13, further comprising one or more sensors operably connected to the sampling rate control module, the one or more sensors comprising at least one of an accelerometer or a proximity sensor, wherein the sampling rate control module is further configured to:
   receive a signal from at least one sensor; and
   adjust the sampling rate of the optical encoder based on the first and second phase offsets and the signal received from the at least one sensor.

15. The electronic device as in claim 13, further comprising a display operably connected to the sampling rate control module, wherein the sampling rate control module is configured to adjust the sampling rate of the optical encoder based on the first and second phase offsets and a state of an application or a user interface displayed on the display.

16. The electronic device as in claim 13, wherein at least one light sensing element comprises a photodiode and the light source comprises a light-emitting diode.

17. The electronic device as in claim 13, wherein the sampling rate control module is configured to adjust a pulse rate of the light source based on the sampling rate of the optical encoder.

18. A non-transitory computer-readable medium having stored thereon executable instructions which, when executed by a processing device, causes the processing device to perform a method of dynamically adjusting a sampling rate of an optical encoder, the method comprising:

sampling signals from two or more light sensing elements in an optical sensor at a first time and determining a first phase offset;
sampling signals from the two or more light sensing elements at a second time and determining a second phase offset; and
adjusting a sampling rate of the optical sensor based on the first and second phase offsets.

19. The non-transitory computer readable medium as in claim 18, wherein adjusting the sampling rate of the optical sensor based on the first and second phase offsets comprises:
   determining a phase delta by subtracting the first phase offset from the second phase offset; and
   adjusting the sampling rate of the optical sensor based on the phase delta.

20. The non-transitory computer readable medium as in claim 19, wherein adjusting the sampling rate of the optical sensor based on the phase delta comprises:
   comparing the phase delta to a first phase delta threshold;
   increasing the sampling rate if the phase delta is equal to or greater than the first phase delta threshold;
   if the phase delta is less than the first phase delta threshold, comparing the phase delta to a second phase delta threshold;
   decreasing the sampling rate if the phase delta is equal to or less than the second phase delta threshold; and
   maintaining the sampling rate if the phase delta is less than the second phase delta threshold.

* * * * *